(12) United States Patent
Miyachi et al.

(10) Patent No.: US 7,564,510 B2
(45) Date of Patent: Jul. 21, 2009

(54) LIQUID CRYSTAL DISPLAY DEVICE AND METHOD FOR DRIVING THE SAME

(75) Inventors: Koichi Miyachi, Kyoto (JP); Iichiro Inoue, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 240 days.

(21) Appl. No.: 10/585,855

(22) PCT Filed: Jan. 20, 2005

(86) PCT No.: PCT/JP2005/001047

§ 371 (c)(1),
(2), (4) Date: Jul. 12, 2006

(87) PCT Pub. No.: WO2005/071477

PCT Pub. Date: Aug. 4, 2005

(65) Prior Publication Data

US 2008/0218646 A1    Sep. 11, 2008

(51) Int. Cl.
*G02F 1/135* (2006.01)

(52) U.S. Cl. .................................. 349/37

(58) Field of Classification Search ............ None
See application file for complete search history.

(56) References Cited

U.S. PATENT DOCUMENTS

| 6,052,163 | A | 4/2000 | Sung |
| 6,052,168 | A | 4/2000 | Nishida et al. |
| 6,160,600 | A | 12/2000 | Yamazaki et al. |
| 6,259,503 | B1 | 7/2001 | Watanabe et al. |
| 6,266,116 | B1 | 7/2001 | Ohta et al. |
| 6,423,385 | B1 | 7/2002 | Kagawa et al. |
| 6,452,657 | B1 | 9/2002 | Suzuki et al. |
| 6,801,293 | B1 | 10/2004 | Nishiyama et al. |

(Continued)

FOREIGN PATENT DOCUMENTS

JP    10-148826    6/1998

(Continued)

OTHER PUBLICATIONS

International Search Report for PCT/JP2005/001047 dated Apr. 12, 2005.

(Continued)

*Primary Examiner*—Sung H Pak
(74) *Attorney, Agent, or Firm*—Nixon & Vanderhye P.C.

(57) ABSTRACT

A pixel 3 includes a pixel electrode 31 and opposed electrodes 32 for generating electric fields between a pair of substrates in directions substantially parallel to the substrates and also includes two regions S1 and S2 defined by the pixel electrode 31 and the opposed electrodes 32. The electric fields are generated in the adjacent regions S1 and S2 in opposite directions. A liquid crystal layer has a structure in which a slow axis indicating a refractive-index anisotropy as viewed in a direction normal to the substrates is vertical to the electric-field direction without an application of an electric field whereas slow axis in these regions S1 and S2 rotate about axes normal to the substrates in opposite directions. In this manner, the viewing angle of a liquid crystal display device is increased and coloring is prevented. In addition, the response speed and the aperture ratio are enhanced.

23 Claims, 12 Drawing Sheets

U.S. PATENT DOCUMENTS

2003/0169247 A1    9/2003    Kawabe et al.

FOREIGN PATENT DOCUMENTS

JP    10-161128    6/1998
JP    2003-222906    8/2003

OTHER PUBLICATIONS

Lee et al., *Wide-Viewing Display Configuration of Helix-Deformed Ferroelectric Liquid Crystals*, IDW '99, pp. 129-132.

U.S. Appl. 10/920,175, filed Aug. 18, 2004, Ishihara et al.
U.S. Appl. No. 11/017,235, filed Dec. 21, 2004, Miyachi et al.
U.S. Appl. No. 11/038,582, filed Jan. 21, 2005, Miyachi et al.
U.S. Appl. No. 11/035,425, filed Jan. 14, 2005, Miyachi et al.
U.S. Appl. No. 11/015,771, filed Dec. 20, 2004, Miyachi et al.
U.S. Appl. No. 11/035,401, filed Jan. 14, 2005, Miyachi et al.
U.S. Appl. No. 11/035,400, filed Jan. 14, 2005, Miyachi et al.
U.S. Appl. No. 11/035,404, filed Jan. 14, 2005, Miyachi et al.
U.S. Appl. No. 11/037,548, filed Jan. 19, 2005, Miyachi et al.
English Translation of Japanese Office Action mailed Dec. 18, 2007 in corresponding Japanese application 2006-520585.

LIQUID CRYSTAL DISPLAY DEVICE AND METHOD FOR DRIVING THE SAME

CROSS-REFERENCE TO RELATED APPLICATION

This application is the US national phase of international application PCT/JP2005/001047 filed 20 Jan. 2005, which designed the U.S. and claims priority to JP 2004-17667 filed Jan. 26, 2004, the entire contents of each of which are hereby incorporated by reference.

TECHNICAL FIELD

The present invention relates to a liquid crystal display device exhibiting a high-speed response and having a wide viewing angle, and also relates to a method for driving the device.

BACKGROUND ART

Liquid crystal display devices have excellent characteristics such as small thicknesses, light weights and low power-consumption among various display devices, and therefore are widely used in image displaying devices such as television sets and VCRs and office automation equipment such as monitors, word processors and personal computers.

Twisted nematic (TN) mode liquid crystal display devices using nematic liquid crystal, for example, have been previously put into practical use. A TN mode liquid crystal display device includes a pair of opposed substrates and a liquid crystal layer provided between the substrates, and generates an electric field between electrodes provided on the respective substrate, thereby driving the liquid crystal layer. Specifically, switching is performed such that the tilt angle of liquid crystal molecules in the liquid crystal layer with respect to one of the substrates increases based on whether an electric field is present or not between the substrates. However, the TN mode liquid crystal display device has drawbacks such as a low response speed and a narrow viewing angle.

On the other hand, as a display mode having a high response speed and a wide viewing angle, ferroelectric liquid crystal (FLC), anti-ferroelectric liquid crystal (AFLC) and others are known. However, these crystals have great deficiencies in shock resistance and temperature characteristics, and thus have not been widely used yet.

In view of this, an in-phase switching (IPS) mode in which switching is performed to have liquid crystal molecules always parallel to a substrate is known to date (see, for example, Patent literature 1.) For example, as shown in FIG. 20, a liquid crystal display device 100 in the IPS mode includes: a pair of substrates sandwiching a liquid crystal layer; first and second electrodes 101 and 102 serving as a pair of parallel electrodes placed on the surface of one of the substrates.

The liquid crystal display device 100 further includes: a plurality of parallel scanning lines 103 running in parallel with each other on one of the substrates; a plurality of signal lines 104 orthogonal to the scanning lines 103; common lines 105 parallel to the scanning lines 103; and thin-film transistors (hereinafter, referred to as TFTs) 106 provided in respective pixels defined by the scanning lines 103 and the signal lines 104.

In each of the pixels, the TFT 106 is connected to one of the signal lines 104 and the base end of the first electrode 101. The front end portion of the first electrode 101 extends in parallel with the signal lines 104. On the other hand, the common line 105 is connected to the base end of the second electrode 102. The front end portion of the second electrode 102 also extends in parallel with the signal lines 104. That is, the front end portions of the first and second electrodes 101 and 102 are parallel to each other.

An electric field is generated between the first and second electrodes 101 and 102 so that liquid crystal molecules in the liquid crystal layer are driven to be switched within a plane parallel to the substrates, thereby providing display. In this liquid crystal display device in the IPS mode, the tilt angle of liquid crystal molecules does not increase, thus obtaining a wider viewing angle than that of a device in the TN mode.

A liquid crystal display device in an FLC mode including a comb-like electrode dividing a pixel into two regions on a substrate is also known to date (see, for example, Non-patent literature 1.) As shown in FIGS. 21 and 22, which are perspective views schematically showing one pixel, a liquid crystal display device 100 disclosed in Non-patent literature 1 includes: an array substrate 121; a counter substrate 122 opposing the array substrate 121; and an FLC mode liquid crystal layer 123 provided between the array substrate 121 and the counter substrate 122.

A first electrode 101 and a second electrode 102 each having a comb-like electrode structure are formed on the array substrate 121. Each pixel is divided into two regions (i.e., domains) by the first and second electrodes 101 and 102. Liquid crystal molecules 108 in the liquid crystal layer 123 are driven by switching the intensity of an electric field generated between the first and second electrodes 101 and 102 to zero or a given value.

In a case where the intensity of the electric field is zero, as shown in FIG. 21, the liquid crystal layer 123 serves as a smectic liquid crystal layer in which liquid crystal molecules 108 are tilted at a given angle to the array substrate 121 and are oriented in spiral forms around axes L in the direction normal to the substrate 121 as an initial orientation.

On the other hand, in a case where an electric field with a given intensity is generated between the first and second electrodes 101 and 102, as shown in FIG. 22, liquid crystal molecules 108 in each layer rotate about the axes L with their tilt angle to the substrate increased and are aligned in a given direction in each region. This structure is formed to increase the display response speed of the liquid crystal display device 100.

However, in the liquid crystal display device 100 disclosed in Non-patent literature 1, when the intensity of the electric field between the electrodes 101 and 102 is zero, no refractive-index anisotropy occurs in the direction normal to the substrates 121 and 122. FIG. 23 is a graph for explaining an index ellipsoid. In FIG. 23, the direction X-Y indicates a direction parallel to the substrates 121 and 122 and the direction Z indicates a direction normal to the substrates 121 and 122. As shown in FIG. 23, out of three principal axes $n_a$, $n_b$ and $n_c$ for representing an index ellipsoid, the principal axis $n_c$ having the largest value is in the direction Z normal to the substrates when the intensity of an electric field is zero. When an electric field has a given intensity value, the principal axis $n_c$ rotates about the electric-field direction parallel to the substrate, as indicated by the arrow B.

Accordingly, the display characteristics of the liquid crystal display device 100 disclosed in Non-patent literature 1 can be assumed to be equivalent to those in a birefringence mode of a liquid crystal display device in which liquid crystal molecules are oriented vertically with respect to a substrate (hereinafter, simply referred to as a birefringence mode with a vertical orientation.) In addition, a pixel in the liquid crystal display device 100 has two domains in which the directions of respective electric fields are opposite to each other, so that the display characteristics of this device are equivalent to those of a liquid crystal display device in which the birefringence mode with the vertical orientation is divided into two.

That is, in actuality, the liquid crystal display device 100 disclosed in Non-patent literature 1 is inferior to a publicly-known liquid crystal display device of a four-domain type in the birefringence mode with the vertical orientation, more specifically, inferior to a device in the IPS mode, in its viewing angle characteristic.

However, in the IPS mode, each pixel is not divided into domains, so that it is difficult to obtain a sufficiently-wide viewing angle. In addition, the IPS mode has the drawback of coloring (color shifts) occurring depending on the direction of view. Specifically, a display in the IPS mode is colored yellow in a given direction of view and is colored blue in another direction of view. Therefore, the display quality is low in the IPS mode.

In view of this, a super in-phase switching (S-IPS) mode in which the IPS mode is improved to suppress coloring was proposed (see, for example, Patent literature 2.) As shown in FIG. 24, for example, a liquid crystal display device 100 in the S-IPS mode has a herringbone electrode structure. For example, the liquid crystal display device 100 includes: scanning lines 103 and signal lines 104 formed in a lattice pattern; TFTs 106 provided at respective intersections of the scanning lines 103 and the signal lines 104; comb-like pixel electrodes 101 connected to the TFTs 106 and serving as first electrodes; and comb-like common electrodes 102 serving as second electrodes and each formed between two adjoining pixel electrodes 101. The base ends of the common electrodes 102 are connected to a common line 105 that extends in parallel with the scanning lines 103 and passes through the center of each pixel.

The above-described herringbone electrode structure is formed by the pixel electrodes 101 and the common electrodes 102. A first display region 111 and a second display region 112 are formed at both sides of the common line 105 and serve as two domains. The initial orientation of liquid crystal molecules in the liquid crystal display device 100 is defined to be in the direction A parallel to the signal lines 104 by using an alignment film subjected to a rubbing process, as shown in FIG. 24.

When a voltage is applied across the pixel electrodes 101 and the common electrodes 102, electric fields are generated in a direction orthogonal to the length direction of the pixel electrodes 101 and the common electrodes 102. Accordingly, liquid crystal molecules 108a in the first display region 111 and liquid crystal molecules 108b in the second display region 112 rotate in different directions such that the directions of the liquid crystal molecules 108a and 108b approach the respective directions of the electric fields. This process is intended to obtain a wide viewing angle and to suppress coloring by making yellow coloring and blue coloring occur in the same direction to compensate for color shifts occurring depending on the direction of view.

Patent literature 1: Japanese Patent Publication No. 10-161128

Patent literature 2: Japanese Patent Publication No. 10-148826

Non-patent literature 3: IDW '99 p. 129 (International Display Workshop '99)

DISCLOSURE OF INVENTION

In the S-IPS mode, however, the direction of refractive-index anisotropy of a liquid crystal layer under no application of an electric field is neither orthogonal nor parallel to the direction in which an electric field is generated under application of an electric field, when viewed in the direction normal to a substrate. Typically, as shown in FIG. 24, the direction of refractive-index anisotropy of a liquid crystal layer under no application of an electric field is at an angle of about 80° with respect to the electric-field direction. This is because if the direction is at an angle of 90°, the rotational direction (clockwise or counterclockwise) of liquid crystal molecules under application of an electric field is not defined, so that an error occurs in display. Therefore, to uniquely define the rotational direction of liquid crystal molecules, the angle between the liquid crystal molecules and the electric-field direction under no application of an electric field needs to be larger or smaller than 90° to some degree.

In addition, in the S-IPS mode, each pixel is divided into domains so as to widen the viewing angle and suppress coloring. However, in this division, the electrode structure needs to have a herringbone electrode shape in order to rotate liquid crystal molecules in different directions between domains. As a result, as long as scanning lines and signal lines are formed in a simple lattice pattern, liquid crystal molecules are not effectively rotated in a corner portion S in each pixel as shown in FIG. 24, so that the problem of great decrease of the aperture ratio arises.

Moreover, in the S-IPS mode, liquid crystal molecules are driven by utilizing dielectric-constant anisotropy of a liquid crystal layer, thus causing the problem that the response time is longer than that in the case of using liquid crystal molecules under spontaneous polarization. In particular, when the intensity of an electric field decreases, the liquid crystal molecules fails to obtain driving force from the electric field and are rotated only by restoring force due to anchoring to the substrate surface. In this case, the above problem is noticeable.

It is therefore an object of the present invention to increase the viewing angle of a liquid crystal display device while suppressing coloring. It is another object of the present invention to increase the response speed and the aperture ratio.

To achieve the objects, a liquid crystal display device according to the present invention includes: a pair of substrates substantially parallel to each other, at least one of the substrates being transparent; and a liquid crystal layer sandwiched and held between the substrates, wherein a plurality of pixels each constituted by parts of the respective substrates and a part of the liquid crystal layer sandwiched between the parts of the substrates are arranged in a matrix pattern, each of the pixels includes first and second electrodes for generating, between the substrates, an electric field in a direction substantially parallel to the substrates and is divided into a plurality of regions, the regions of each of the pixels are defined by the first and second electrodes, the direction of an electric field generated in one of the regions is opposite to that of an electric field generated in an adjacent one of the regions, and the liquid crystal layer has a structure in which when no electric field is generated, a slow axis indicating a refractive-index anisotropy as viewed in a direction normal to the substrates in each of the regions is vertical or parallel to the direction in which an electric field is to be generated whereas when an electric field is generated, the slow axis rotates about an axis normal to the substrates and slow axes in adjacent ones of the regions rotate in opposite directions.

It is preferable that polarization is present in the liquid crystal layer when no electric field is generated between the first and second electrodes.

It is preferable that a component of an average polarization direction in a direction parallel to the substrates is orthogonal to the direction in which an electric field is to be generated, when no electric field is generated between the first and second electrodes.

The polarization in the liquid crystal layer may be caused by a flexoelectric effect.

It is preferable that the liquid crystal layer contains liquid crystal molecules having a pretilt angle with respect to at least the interface between the liquid crystal layer and one of the substrates.

It is preferable that a direction obtained by projecting a pretilt direction of the liquid crystal molecules is orthogonal to the direction of an electric field generated between the first and second electrodes.

The pretilt angle of the liquid crystal molecules may be defined by one of a rubbing process and a photo-alignment process.

It is preferable that the liquid crystal molecules have pretilt angles with respect to both of the interface between the liquid crystal layer and one of the substrates and the interface between the liquid crystal layer and the other substrate and directions obtained by projecting pretilt directions of the liquid crystal molecules onto the respective substrates are identical.

The first and second electrodes may be driven such that potential levels of the respective first and second electrodes alternate with each other.

It is preferable that each of the pixels includes a switching element for driving the liquid crystal layer, and also includes the signal lines and the scanning lines connected to the switching element and arranged in a lattice pattern, and the first and second electrodes extend in parallel with the signal lines or the scanning lines.

The first and second electrodes may be alternately arranged.

It is preferable that at least part of the periphery of an electrode group composed of the first and second electrodes is constituted by opposed electrodes connected to a common line.

It is preferable that the liquid crystal layer is driven at a frequency that is an even multiple of a frame frequency of a video signal, and a period in which the liquid crystal layer is driven by a positive electric field is equal to a period in which the liquid crystal layer is driven by a negative electric field.

A pulse voltage applied to the liquid crystal layer may be set at zero temporarily at every vertical synchronization period of a video signal.

A pulse voltage applied to the liquid crystal layer in a vertical synchronization period of a video signal may have a polarity opposite to that of a signal voltage applied to the liquid crystal layer in the same vertical synchronization period, at every vertical synchronization period.

The liquid crystal layer is preferably in the state of a splay orientation. Alternatively, the liquid crystal layer may be in the state of a bend orientation. The liquid crystal layer may also be in the state of a hybrid orientation.

It is preferable that a dielectric-constant anisotropy of the liquid crystal layer preferably has an absolute value of three or less. It is more preferable that a dielectric-constant anisotropy of the liquid crystal layer has an absolute value of one or less.

In a method for driving a liquid crystal display device according to the present invention, the first and second electrodes are driven such that potential levels of the respective first and second electrodes alternate with each other.

In another method for driving a liquid crystal display device according to the present invention, the liquid crystal layer is driven at a frequency that is an even multiple of a frame frequency of a video signal, and a period in which the liquid crystal layer is driven by a positive electric field is equal to a period in which the liquid crystal layer is driven by a negative electric field.

In still another method for driving a liquid crystal display device according to the present invention, a pulse voltage applied to the liquid crystal layer is set at zero temporarily at every vertical synchronization period of a video signal.

In yet another method for driving a liquid crystal display device according to the present invention, a pulse voltage applied to the liquid crystal layer in a vertical synchronization period of a video signal has a polarity opposite to that of a signal voltage applied in the same vertical synchronization period, at every vertical synchronization period.

—Effects—

Now, effects of the present invention will be described.

A pixel is divided into a plurality of regions. When a given voltage is applied to a first electrode and a second electrode in each of the regions, a given electric field is generated between the first and second electrodes. The direction of this electric field (hereinafter, referred to as an electric-field direction) is substantially parallel to a substrate. In addition, electric fields are generated in opposite directions in adjacent regions.

When no electric field is generated between the first and second electrodes, the slow axis of the liquid crystal layer in each of the regions is vertical or parallel to the electric-field direction. On the other hand, when an electric field is generated between the first and second electrodes, the slow axis of the liquid crystal layer in each of the regions rotates about an axis normal to the substrate. In other words, liquid crystal molecules in the liquid crystal layer rotate about axes normal to the substrate. Regarding the rotational direction, liquid crystal molecules rotate in opposite directions in adjacent regions. In this manner, upon application of a voltage to the first and second electrodes, the liquid crystal layer is driven by switching.

Accordingly, in a liquid crystal display device according to the present invention, liquid crystal molecules in a liquid crystal layer rotate within a plane parallel to a substrate in regions (domains) of a pixel and are not tilted with respect to the substrate, so that a wider viewing angle than that in the case of a TN mode is obtained. In addition, liquid crystal molecules in the liquid crystal layer rotate in different directions in adjacent regions in each pixel, thereby compensating for color shifts depending on the direction of view. As a result, coloring is suppressed.

In addition, by switching the polarity of an electric field generated between the first and second electrodes, liquid crystal molecules in the liquid crystal layer obtains driving force from the electric field in both the positive and negative rotational directions. As a result, the display response speed is enhanced. Moreover, the first and second electrodes do not need to have a herringbone shape in order to suppress coloring. Accordingly, liquid crystal molecules in a corner portion of a pixel are driven to rotate in a preferable manner, thus enabling increase of the aperture ratio as compared to an S-IPS mode.

The liquid crystal layer exhibits polarization in the absence of an electric field, so that rotational direction of the slow axis of the liquid crystal layer (i.e., rotational direction of liquid crystal molecules) is switched between clockwise and counterclockwise depending on the polarity of the electric field.

A component of an average polarization direction of the liquid crystal layer in the direction parallel to the substrate is orthogonal to the electric-field direction when no electric field is generated, so that liquid crystal molecules rotate at the same angle in both cases where the direction of the electric field is positive and negative, respectively. As a result, rotations of liquid crystal molecules in adjacent regions are symmetric with respect to the boundary between these regions, thus preventing flickering due to polarization inversion of an electric field.

Liquid crystal molecules in the liquid crystal layer have a pretilt angle to the interface between the liquid crystal layer and one of the substrates, so that flexoelectric effect occurs to cause polarization in the liquid crystal layer. The direction obtained by projecting the pretilt direction of the liquid crystal molecules onto the substrate is orthogonal to the electric-field direction, so that rotations of liquid crystal molecules in adjacent regions are symmetric with respect to the boundary between these regions. Accordingly, no flickering due to polarization inversion of an electric field occurs.

Liquid crystal molecules have pretilt angles to the respective interfaces between the liquid crystal layer and both of the substrates and the directions obtained by projecting the pretilt directions of the liquid crystal molecules onto the substrates are identical, thus increasing polarization caused by the flexoelectric effect.

The first and second electrodes are driven such that potential levels of the respective first and second electrodes alternate with each other, thus suppressing image burn-in. Even in a case where the area ratio among a plurality of regions differs depending on the orientation of the switching element and others, flickering occurring at an oblique angle of view is suppressed.

Each of the pixels includes signal lines and scanning lines arranged in a lattice pattern and the first and second electrodes are formed in parallel with either the signal lines or the scanning lines. Accordingly, liquid crystal molecules are driven in a preferable manner even in a side portion of the pixel, thus increasing the aperture ratio of the pixel.

At least part of the periphery of an electrode group composed of the first and second electrodes is constituted by opposed electrodes connected to a common line. Accordingly, crosstalks (i.e., shadows) occurring between the signal lines and the first or second electrode are suppressed in each of the pixels.

The liquid crystal layer is driven at a frequency that is an even multiple of a frame frequency of a video signal, and a period in which the liquid crystal layer is driven by a positive electric field is equal to a period in which the liquid crystal layer is driven by a negative electric field. Accordingly, flickering in display is suppressed.

A pulse voltage applied to the liquid crystal layer is set at zero temporarily at every vertical synchronization period of a video signal. Alternatively, a pulse voltage applied to the liquid crystal layer in a vertical synchronization period of a video signal has a polarity opposite to that of a signal voltage applied in the same vertical synchronization period, at every vertical synchronization period. Accordingly, black displays are inserted between consecutive images, thus improving performance in displaying moving pictures.

The liquid crystal layer is in the state of a splay orientation, a bend orientation or a hybrid orientation. Accordingly, polarization due to the flexoelectric effect is obtained.

In a response due to dielectric-constant anisotropy of a liquid crystal layer as in conventional examples, rotational direction cannot be reversed by switching an electric field between positive and negative and the response speed is low. Accordingly, it is preferable to suppress the response due to dielectric-constant anisotropy. On the other hand, if the absolute value of the dielectric-constant anisotropy is three or less, preferably one or less, the influence of the electric-field response due to dielectric-constant anisotropy is suppressed, so that a response due to polarization is effectively exhibited.

According to the present invention, liquid crystal molecules in a liquid crystal layer (the slow axis of the liquid crystal layer) rotate within a plane substantially parallel to substrates in a plurality of divided regions, thus obtaining a wide viewing angle. In addition, liquid crystal molecules rotate in opposite directions in adjacent regions, thus suppressing coloring.

In addition, liquid crystal molecules in the liquid crystal layer obtain driving force from an electric field in both forward and reverse rotational directions, thus increasing the display response speed. It is unnecessary for the first and second electrodes to have a herringbone shape in order to suppress coloring. Accordingly, liquid crystal molecules in a corner portion of a pixel are driven to rotate in a preferable manner, thus increasing the aperture ratio.

BEST MODE FOR CARRYING OUT THE INVENTION

Hereinafter, embodiments of the present invention will be described in detail. The present invention is not limited to the following embodiments.

EMBODIMENT 1

Figure 1:
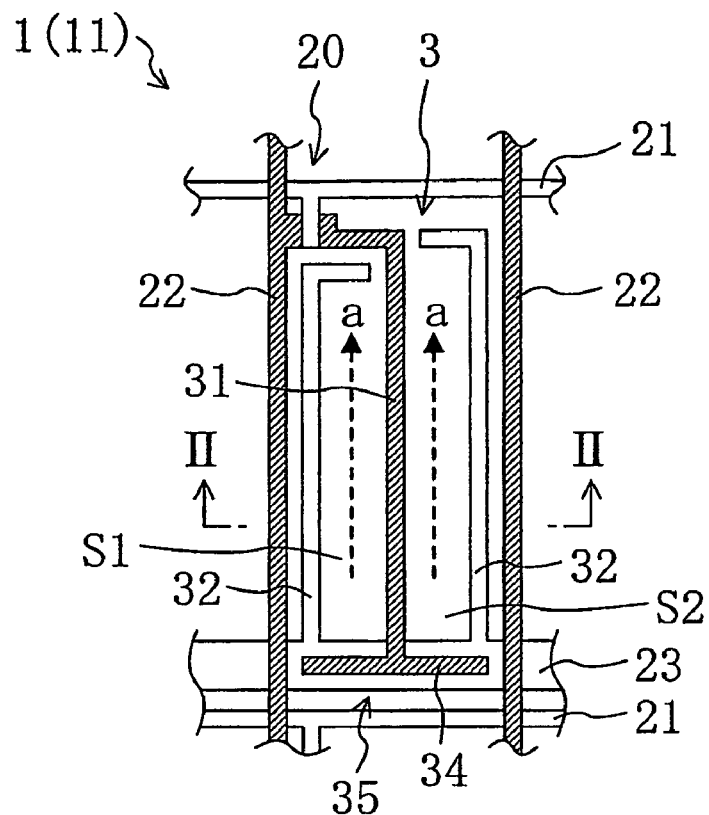
FIG. 1 is a plan view showing a liquid crystal display device according to a first embodiment in an enlarged manner.
Figure 2:
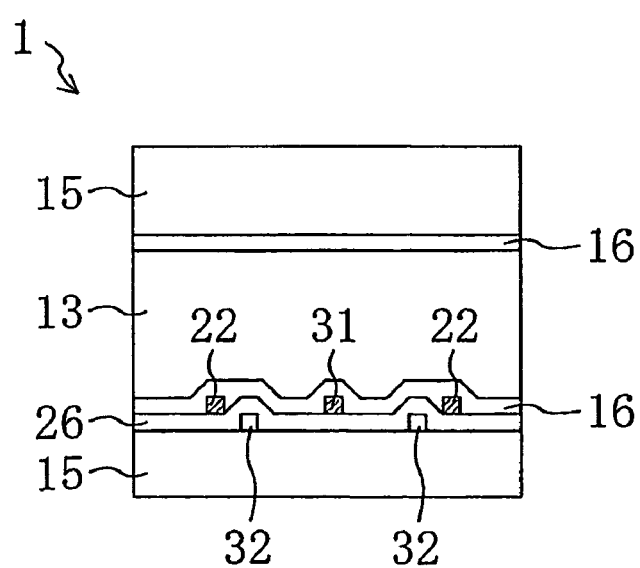
FIG. 2 is a cross-sectional view taken along the line II-II in FIG. 1.

FIGS. 1 through 12 show a liquid crystal display device and a method for driving the device according to a first embodiment of the present invention. FIG. 1 is a plan view showing a pixel in a liquid crystal display device 1 in an enlarged manner. FIG. 2 is a cross-sectional view taken along the line II-II in FIG. 1.

As shown in FIG. 2, the liquid crystal display device 1 includes: a pair of substrates 11 and 12; and a liquid crystal layer 13 sandwiched and held between the substrates 11 and 12. The pair of substrates 11 and 12 is composed of an array substrate 11 on which a plurality of TFTs 20 serving as switching elements are arranged in a matrix pattern and a counter substrate 12 opposing the array substrate 11. As shown in FIG. 1 in an enlarged manner, in the liquid crystal display device 1, a plurality of pixels 3 including the TFTs 20 are arranged in a matrix pattern. Each of the pixels 3 includes part of the array substrate 11, part of the counter substrate 12 opposing the part of the array substrate 11 and part of the liquid crystal layer 13 sandwiched between these parts of the substrates.

The liquid crystal display device 1 is, for example, a transmissive liquid crystal display device and provides desirable display by permitting transmission of light from a backlight (not shown) placed at the side toward the array substrate 11, i.e., placed at the back.

Figure 3:
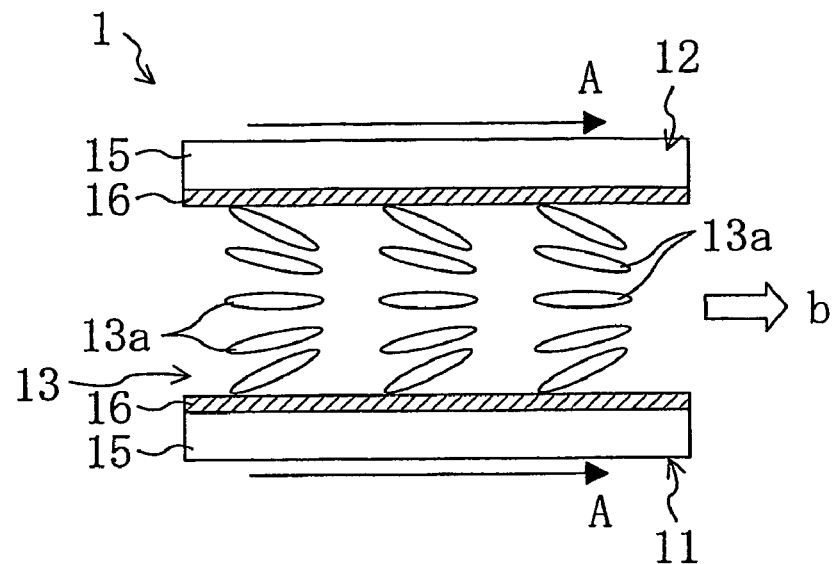
FIG. 3 is a cross-sectional view schematically showing a cross section of the liquid crystal display device.

As shown in FIG. 3, which is a cross-sectional view, the array substrate 11 and the counter substrate 12 include: glass substrates 15 that are transparent insulating substrates, for example; and alignment films 16 formed on the opposed surfaces of the substrates 11 and 12 (i.e., at the interfaces between the substrates and the liquid crystal layer 13.) A rubbing process has been performed on the alignment films 16 of the array substrate 11 and the counter substrate 12 in the same direction A as shown in FIG. 3.

As shown in FIG. 1, on the array substrate 11, a plurality of TFTs 20 for driving the liquid crystal layer 13, a plurality of scanning lines 21 for supplying scanning signals to the TFTs 20, and signal lines 22 for supplying image signals to the TFTs 20 are provided. The scanning lines 21 are connected to gate electrodes (not shown) of the TFTs 20 and the signal lines 22 are connected to source electrodes (not shown) of the TFTs 20.

The scanning lines 21 are parallel to each other. On the other hand, the signal lines 22 are orthogonal to the scanning lines 21. That is, the scanning lines 21 and the signal lines 22 are formed in a lattice pattern. The TFTs 20 are placed near respective intersections between the scanning lines 21 and the signal lines 22. A rectangular region defined by adjacent two of the scanning lines 21 and adjacent two of the signal lines 22 is formed in each of the pixels 3.

The array substrate 11 has a comb-like electrode structure for generating an electric field in a direction substantially parallel to the array substrate 11. The comb-like electrode structure is formed by alternately arranging pixel electrodes 31 serving as first electrodes and opposed electrodes serving as second electrodes.

Drain electrodes (not shown) of the TFTs 20 are connected to the base ends of the pixel electrodes 31. As shown in FIG. 1, each of the pixel electrodes 31 is parallel to the signal lines 22 and passes through the center of an associated one of the pixels 3. The front end of the pixel electrode 31 is located near one of the scanning lines 21 connected to one of the TFTs 20 included in an adjacent one of the pixels 3.

Common lines 23 are further provided on the array substrate 11. Each of the common lines 23 is located near one of the scanning lines 21 connected to the TFT 20 in an adjacent one of the pixels 3 and extends in parallel with the scanning lines 21. On the other hand, capacitive electrodes 34 parallel to the common lines 23 are provided at the front ends of the respective pixel electrodes 31 in such a manner that each of the capacitive electrodes 34 overlaps with an associated one of the common lines 23 when viewed in the direction normal to the array substrate 11. In other words, each of the capacitive electrodes 34 is connected to the front end of an associated one of the pixel electrodes 31 and overlaps with an associated one of the common lines 23. This overlapping portion of the capacitive electrode 34 and the common line 23 forms an auxiliary capacitor 35. The auxiliary capacitor 35 is provided in each of the pixels 3.

As shown in FIG. 1, in each of the pixels 3, two opposed electrodes 32, for example, are provided. The opposed electrodes 32 sandwich one pixel electrode 31 and extend in parallel with the pixel electrode 31 in each pixel. That is, the opposed electrodes 32 are parallel to the signal lines 22. The base ends of the opposed electrodes 32 are connected to the common line 23 whereas the front ends of the opposed electrodes 32 bend inward (i.e., toward the pixel electrode 31) near the scanning line 21. The opposed electrodes 32 are placed near the inner sides of the signal lines 22 in the pixel 3. The opposed electrodes 32 are preferably placed in a portion of the pixel 3 as close to the outer sides of the pixel 3 as possible. The periphery of an electrode group composed of the pixel electrode 31 and the opposed electrodes 32 is at least partly formed by the opposed electrodes 32.

In this manner, as shown in FIG. 1, each of the pixels 3 includes two regions S1 and S2 defined by the pixel electrode 31 and the opposed electrodes 32. The first region S1 is a region defined at the left side of the pixel electrode 31 in FIG. 1 and the second region S2 is defined at the right side of the pixel electrode 31 in FIG. 1. Each of the pixels 3 includes; a TFT 20, a pixel electrode 31, two opposed electrodes 32, parts of two scanning lines 21, parts of two signal lines 22, a common line 23 and an auxiliary capacitor 35.

Now, the structure of the array substrate 11 will be described with reference to FIG. 2, which is a cross-sectional view. The common lines 23, the opposed electrodes 32 and the scanning lines 21 are formed on the glass substrate 15 by patterning using photolithography, for example. An insulating film 26 is formed on the glass substrate 15 to cover the common lines 23, the opposed electrodes 32 and the scanning lines 21. The pixel electrodes 31 and the signal lines 22 are formed over the glass substrate 15 by patterning using photolithography, for example. The alignment film 16 is provided on the insulating film 26 to cover the pixel electrodes 31 and the signal lines 22.

In this manner, the pixel electrodes 31 and the opposed electrodes 32 are configured such that electric fields are generated between the array substrate 11 and the counter substrate 12 in a direction substantially parallel to the substrates 11 and 12 and orthogonal to the parallel pixel electrodes 31 and opposed electrodes 32 by applying a given signal voltage to the pixel electrodes 31 via the TFTs 20. The electric fields are generated in opposite directions in the respective adjacent first and second regions S1 and S2. In other words, the directions of the electric fields generated in each of the pixels 3 are 180° different from each other between the regions S1 and S2.

Figure 5:
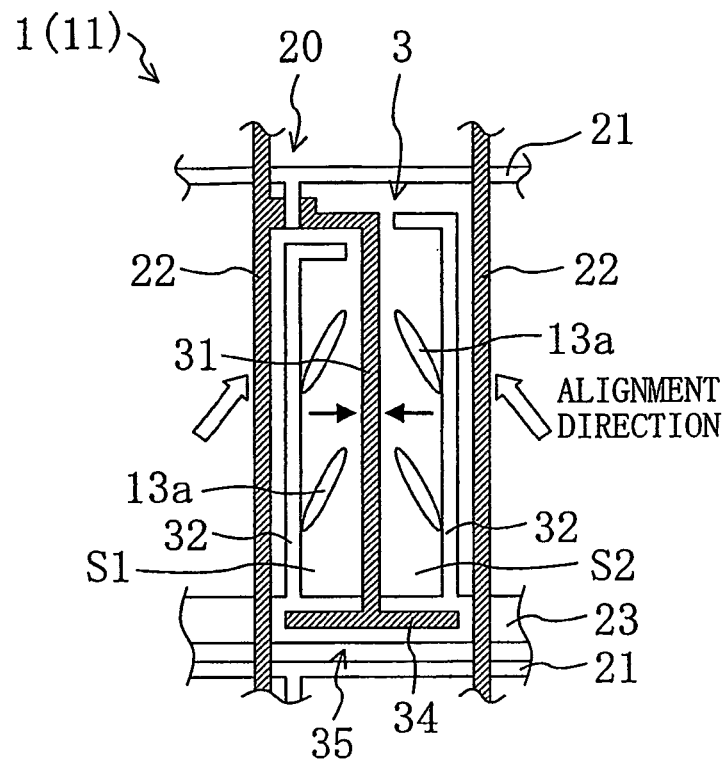
FIG. 5 is a plan view showing the liquid crystal display device when a positive signal voltage is applied.

Specifically, in each of the regions, if a positive signal voltage is applied to the pixel electrode 31, an electric field is generated in a direction from the outer opposed electrode 32 toward the inner pixel electrode 31, as indicated by a black arrow in FIG. 5. This direction will be hereinafter referred to as a positive direction. On the other hand, if a negative voltage is applied to the pixel electrode 31, an electric field is generated in a direction from the inner pixel electrode 31 to the outer opposed electrode 32 as indicated by a black arrow in FIG. 6. This direction will be hereinafter referred to as a negative direction.

As shown in FIG. 3, liquid crystal molecules 13a of the liquid crystal layer 13 are defined to have pretilt angles with respect to the respective interfaces between the liquid crystal layer 13 and both the substrates 11 and 12 by the rubbing process. As shown in FIG. 1, in the adjacent regions, the directions a obtained by projecting the pretilt directions of the liquid crystal molecules 13a onto the array substrate 11 are identical when no electric field is generated in the liquid crystal layer 13, and are orthogonal to the direction of an electric field to be generated between the pixel electrode 31 and the opposed electrode 32.

As shown in FIG. 3, a component b of an average polarization direction in a direction parallel to the substrates 11 and 12 in the liquid crystal layer 13 is orthogonal to the electric-field direction when no electric field is generated between the pixel electrode 31 and the opposed electrode 32. That is, the liquid crystal layer 13 is in the state of a splay orientation. At this time, flexoelectric polarization induced by splay deformation occurs in the liquid crystal layer 13. That is, polarization is caused by this flexoelectric effect.

As liquid crystal materials for the liquid crystal layer 13, a compound having a positive dielectric-constant anisotropy and a compound having a negative dielectric-constant anisotropy are mixed to cancel these dielectric-constant anisotropies, as described below. The dielectric-constant anisotropy is herein a value obtained by dividing, by a vacuum dielectric constant, the value obtained by subtracting a dielectric constant in the short axis direction of liquid crystal molecules from a dielectric constant in the long axis direction thereof.

The following chemical formula 1 represents an example of a compound having a positive dielectric-constant anisotropy:

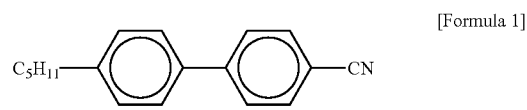
[Formula 1]

The following chemical formulas 2 through 4 represent examples of chemical formulas having negative dielectric-constant anisotropies. The compounds represented by the respective chemical formulas 2 through 4 are preferably mixed in such a manner that the compound represented by the chemical formula 2 is 30 wt %, the compound represented by the chemical formula 3 is 40 wt % and the compound represented by the chemical formula 4 is 30 wt %.

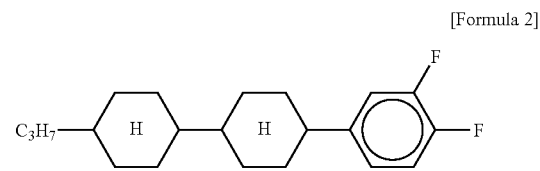
[Formula 2]

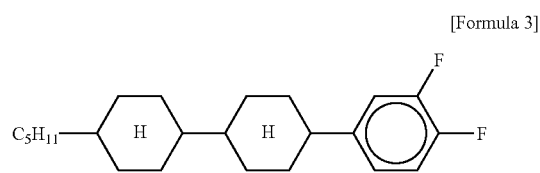
[Formula 3]

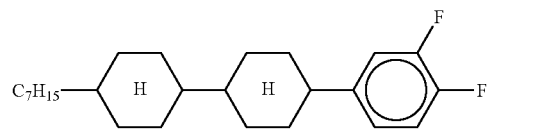
[Formula 4]

The liquid crystal layer 13 has a dielectric-constant anisotropy whose absolute value is three or less. The absolute value of this dielectric-constant anisotropy is preferably one or less. The optimum dielectric-constant anisotropy is zero in this example. This is because of the following reasons. If the dielectric-constant anisotropy is three or more, not only flexoelectric polarization but also dielectric-constant anisotropy greatly affects the response characteristic, so that a feature of the present invention in which the rotational direction is reversed depending on the polarity of an electric field is not achieved and, in addition, the problem of low response speed arises.

In the liquid crystal layer 13, the slow axis showing a refractive-index anisotropy when viewed in the direction normal to the substrates 11 and 12 is vertical to the electric-field direction when no electric fields are generated. On the other hand, when electric fields are generated, the slow axes of the liquid crystal layer 13 rotate about axes normal to the substrates 11 and 12 in opposite directions in adjacent regions.

Figure 4:
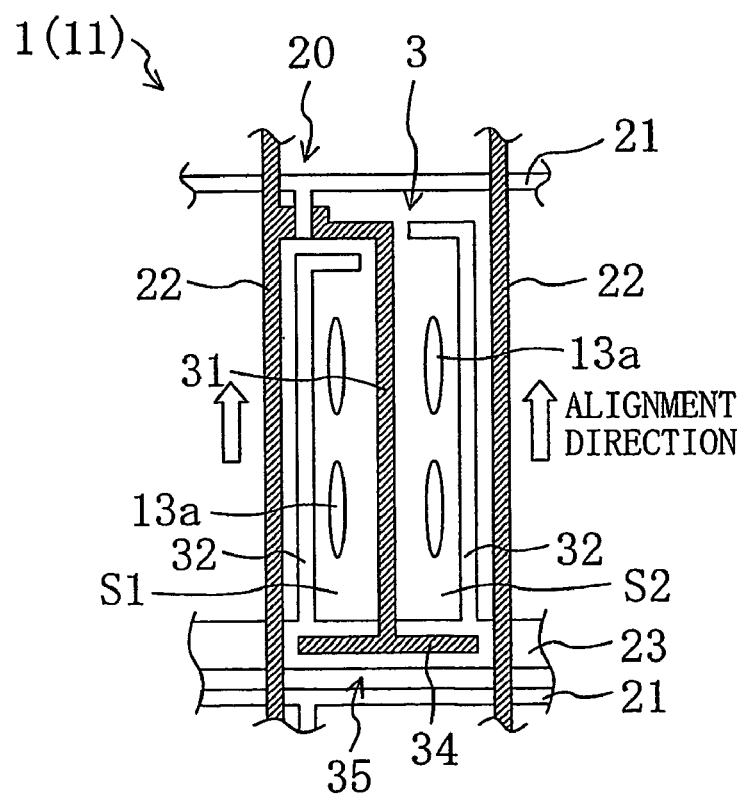
FIG. 4 is a plan view showing the liquid crystal display device when a signal voltage is zero.

Specifically, as shown in FIG. 4, the orientation of liquid crystal molecules 13a in the liquid crystal layer 13 are determined by the alignment film 16 and aligned in the length direction of the pixel electrodes 31, i.e. the direction vertical to the electric-field direction, when no electric fields are generated between the pixel electrode 31 and the opposed electrodes 32. On the other hand, when electric fields are generated, polarized liquid crystal molecules 13a obtains driving force from the electric fields and rotate in opposite directions by the same angle in the respective regions S1 and S2. As a result, the slow axes in the liquid crystal layer 13 rotate in accordance with rotations of the liquid crystal molecules 13a.

—Method for Driving Liquid Crystal Display Device—

Now, a method for driving the liquid crystal display device 1 of the present invention will be described with reference to FIGS. 4 through 12. FIGS. 7 through 12 are time charts showing signal voltages applied to the pixel electrodes 31.

Figure 7:
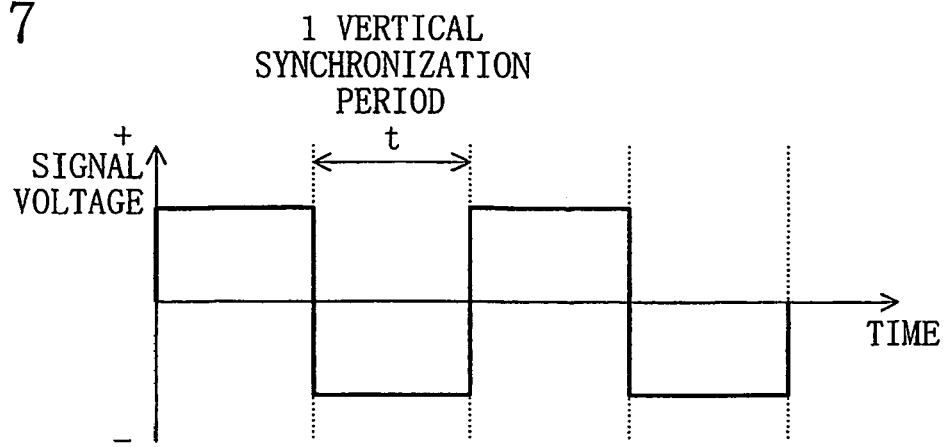
FIG. 7 is a time chart for explaining a basic method for driving a liquid crystal display device.

FIG. 7 shows a basic method for driving the liquid crystal display device 1. As shown in FIG. 7, the liquid crystal display device 1 is basically driven such that the polarity of an electric field generated in the liquid crystal layer 13 is reversed at each frame.

Figure 8:
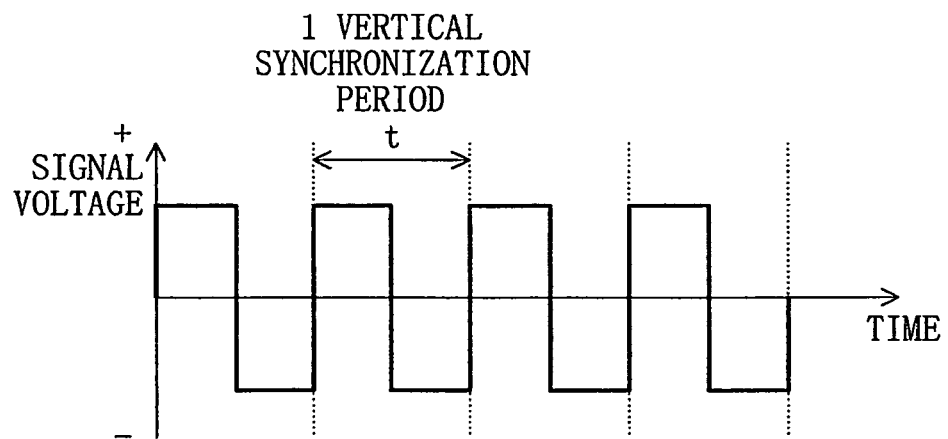
FIG. 8 is a time chart for explaining a driving method using a frequency that is twice as high as a frame frequency.

On the other hand, in a driving method shown in FIG. 8, the liquid crystal layer 13 is driven at a frequency that is an even multiple (two or more) of the frame frequency of a video signal. Then, periods during which the liquid crystal layer 13 is driven by the positive and negative electric fields, respectively, are set equal to each other. In this manner, flickering in display is suppressed.

Specifically, as shown in FIG. 7, the pixel electrodes 31 and the opposed electrode 32 are driven such that the potential levels of the respective opposed electrodes 31 and the pixel electrode 32 alternate with each other at every period t corresponding to a vertical synchronization period of a video signal. That is, a signal voltage applied to the pixel electrode 31 is switched between positive and negative at every period t.

When a positive signal voltage is applied to the pixel electrode 31, an electric field is generated in a positive direction from the opposed electrode 32 to the pixel electrode 31 in each of the regions S1 and S2, as indicated by the black arrow in FIG. 5. This positive electric field causes polarized liquid crystal molecules 13a to rotate clockwise by a given angle in the first region S1 and counterclockwise by the same given angle in the second region S2, when viewed from the top of the array substrate 11 (i.e., viewed from the front side of the sheet in FIGS. 4 through 6.)

Figure 6:
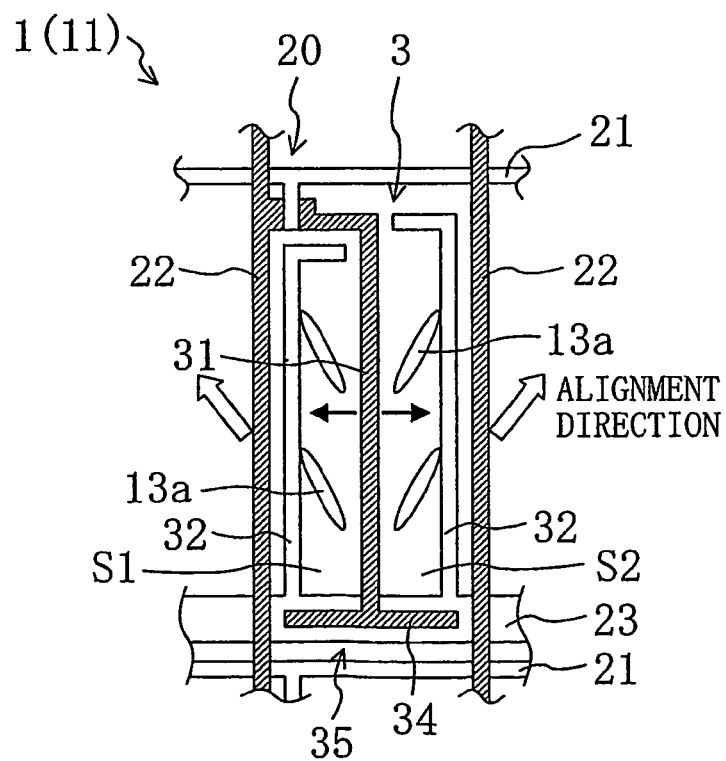
FIG. 6 is a plan view showing the liquid crystal display device when a negative signal voltage is applied.

When a negative voltage is applied to the pixel electrode 31 after a lapse of the period t, an electric field is generated in a negative direction from the pixel electrode 31 to the opposed electrode 32 in each of the regions S1 and S2, as indicated by the black arrow in FIG. 6. This negative electric field causes polarized liquid crystal molecules 13a to rotate counterclockwise by a given angle in the first region S1 and clockwise by the same given angle in the second region S2, when viewed from the top of the array substrate 11. In this manner, an image is switched in accordance with switching of an applied voltage at every period t, thus displaying a picture.

The electric-field direction is alternately switched in the regions S1 and S2 in each of the pixels 3, so that image burn-in is avoided in the pixel 3 and, in addition, even if the areas of the regions S1 and S2 are slightly differ from each other, flickering at an oblique angle of view is prevented.

Figure 9:
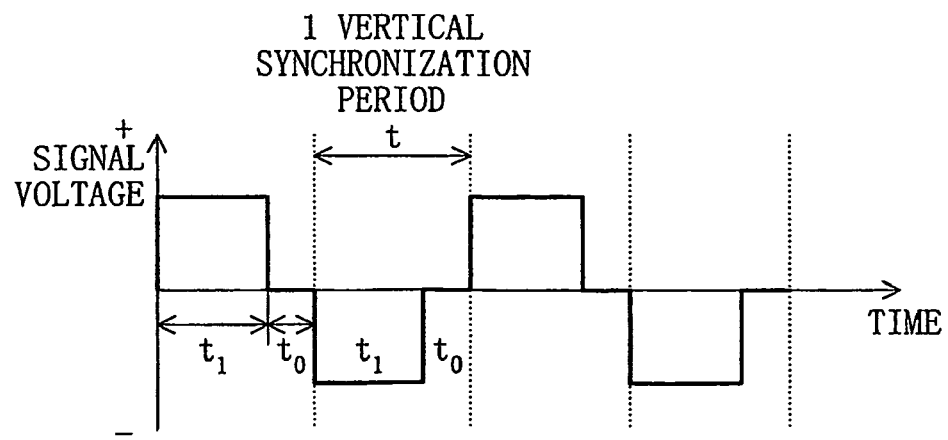
FIG. 9 is a time chart showing a driving method in which black displays are inserted in the basic driving method.

FIG. 9 shows a driving method in which a signal voltage applied to the liquid crystal layer 13 is set at zero for a short time at every vertical synchronization period of a video signal. Specifically, a positive or negative signal voltage is applied to the pixel electrode 31 during an initial period $t_1$ in the period t, and the signal voltage applied to the pixel electrode 31 is set at zero during a next period $t_0$ in the period t (where $t_0=t-t_1$). In this manner, the voltage applied to the pixel electrode 31 is set at zero at every vertical synchronization period for switching an image, so that black displays are inserted between consecutive images. Accordingly, performance in displaying moving pictures is improved, and impulse display equivalent to that in the case of CRTs is achieved.

Figure 10:
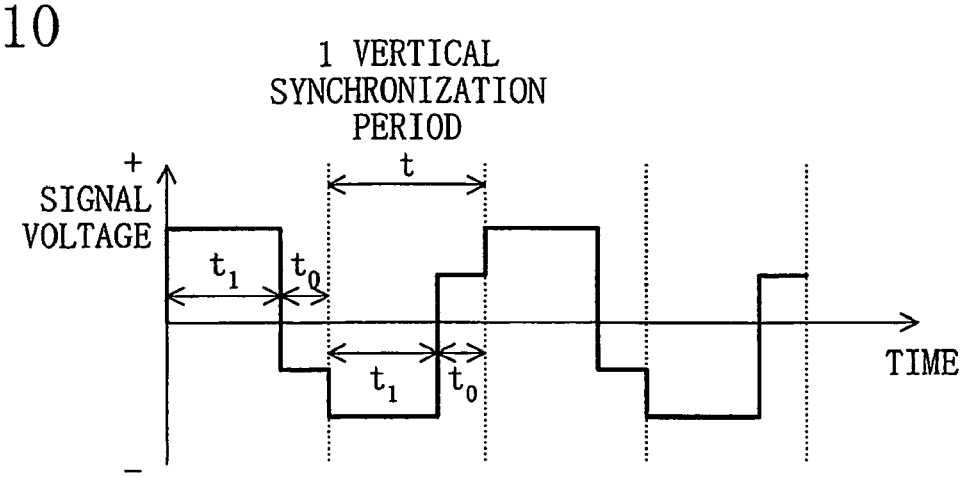
FIG. 10 is a time chart showing a driving method in which black displays are inserted in the basic driving method.

FIG. 10 shows a driving method in which a pulse voltage whose polarity is opposite to that of a signal voltage applied to the liquid crystal layer 13 in the same period is applied at every vertical synchronization period of a video signal. Specifically, a positive or negative signal voltage is applied to the pixel electrode 31 during the initial period $t_1$ in the period t, and a signal voltage whose polarity is opposite to that of the signal voltage applied during the period $t_1$ is applied to the pixel electrode 31 during the next period $t_0$ in the period t (where $t_0=t-t_1$).

For example, as shown in FIG. 10, in one vertical synchronization period, a positive signal voltage is applied during the period $t_1$ and then a negative signal voltage is applied during the period $t_0$. The effective value of the negative signal voltage applied during the period $t_0$ is set smaller than that of the positive voltage applied during the period $t_1$. Subsequently, in the next vertical synchronization period, a negative signal voltage is applied during the period $t_1$, and then a positive signal voltage having an effective value smaller than that of the negative voltage applied during the period $t_1$ is applied during the next period $t_0$. In this manner, signal voltages having opposite polarities are applied in the form of pulses, so that liquid crystal molecules 13a are forced to rotate in opposite directions. Accordingly, the speed of switching display increases by inserting black displays, so that performance in displaying moving pictures is further improved. It should be noted that the effective value is a time-average value of the square of a voltage.

Figure 11:
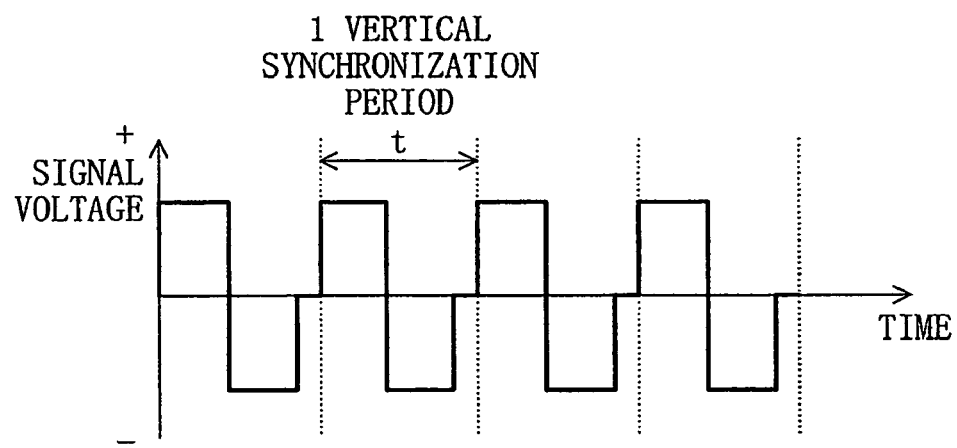
FIG. 11 is a time chart showing a driving method in which black displays are inserted in the driving method using a frequency that is twice as high as a frame frequency.
Figure 12:
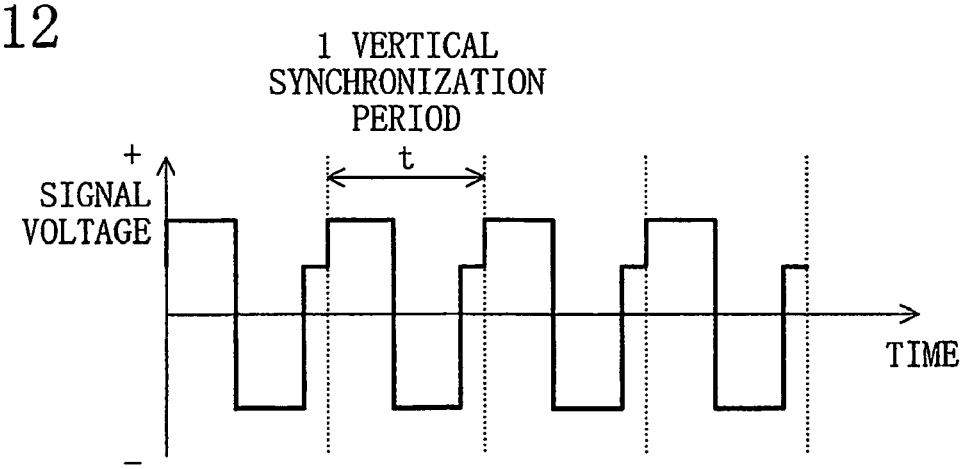
FIG. 12 is a time chart showing a driving method in which black displays are inserted in the driving method using a frequency that is twice as high as a frame frequency.

FIGS. 11 and 12 show cases where a frequency twice as high as the frame frequency is used in the respective driving methods in which black displays are inserted as shown in FIGS. 9 and 10. In these cases, a period in which a signal voltage applied to the pixel electrode 31 is set at zero is also provided in every vertical synchronization period. Accordingly, the driving methods shown in FIGS. 11 and 12 also suppress flickering and enhance performance in displaying moving images.

Effects of Embodiment 1

Therefore, in the first embodiment, liquid crystal molecules 13a in the liquid crystal layer 13 rotate within a plane substantially parallel to the array substrate 11 in the regions S1 and S2, which are domains obtained by dividing a pixel, and are not tilted, so that a viewing angle wider than that in the case of a TN mode is obtained. In addition, the liquid crystal molecules 13a in the liquid crystal layer 13 rotate in different directions in the respective adjacent regions S1 and S2 in each of the pixels 3 to compensate for color shifts occurring in the regions S1 and S2 depending on the direction of view, so that coloring depending on the direction of view is desirably suppressed.

In addition, the liquid crystal molecules 13a in the liquid crystal layer 13 obtain driving force from an electric field generated between the pixel electrode 31 and the opposed electrode 32 by switching the polarity of the electric field in either case of the positive and negative rotational directions, so that the display response speed is enhanced. Furthermore, unlike the conventional S-IPS mode, it is unnecessary for the pixel electrodes 31 and the opposed electrodes 32 to have a herringbone shape in order to suppress coloring. Accordingly, if the scanning lines 21 and the signal lines 22 are formed in a simple lattice pattern, the liquid crystal molecules 13a are driven to rotate in a preferable manner in the entire area of each of the pixels 3, thus increasing the aperture ratio.

Moreover, a component of an average polarization direction in the direction parallel the substrates in the liquid crystal layer 13 is orthogonal to the electric-field direction when no electric field is generated, so that rotational angles of the liquid crystal molecules 13a are identical in both cases where the electric-field direction is positive and negative, respectively. The directions obtained by projecting the pretilt directions of the liquid crystal molecules 13a in the adjacent regions S1 and S2 onto the array substrate 11 are orthogonal to the electric-field direction. Accordingly, rotations of liquid crystal molecules 13a in these regions S1 and S2 are symmetric with respect to the boundary between the regions S1 and S2, thus preventing flickering due to polarization inversion of an electric field. In this case, the directions obtained by projecting the pretilt directions of the liquid crystal molecules 13a in these regions S1 and S2 onto the substrate are identical, thus increasing polarization caused by the flexoelectric effect.

Both sides of the electrode group composed of the pixel electrode 31 and the opposed electrodes 32 are constituted by the opposed electrodes 32 in each of the pixels 3, so that the distance between the pixel electrode 31 and each of the signal lines 22 is relatively large. This suppresses crosstalks (i.e., shadows) occurring between the pixel electrode 31 and the signal lines 22 in each of the pixels 3.

EMBODIMENT 2

Figure 13:
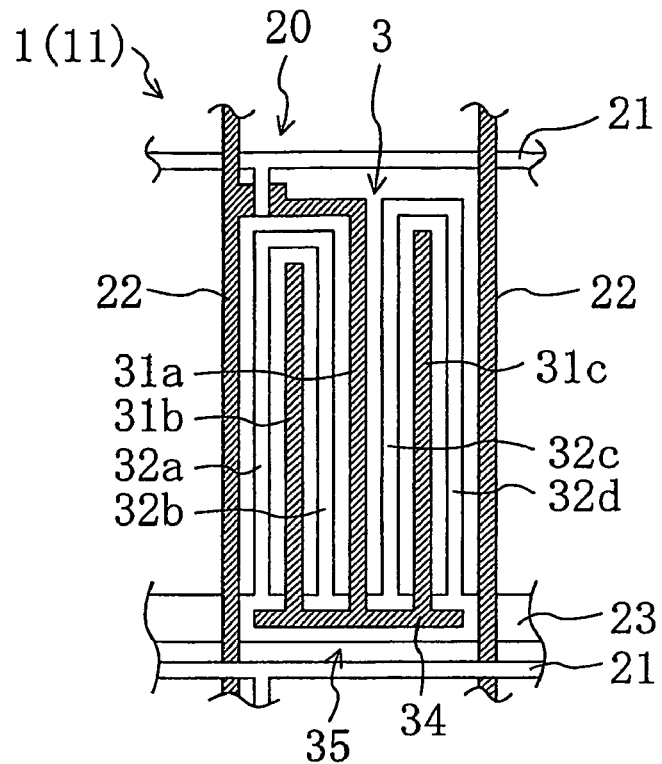
FIG. 13 is a plan view showing a liquid crystal display device according to a second embodiment in an enlarged manner.

FIG. 13 shows a liquid crystal display device 1 according to a second embodiment of the present invention. FIG. 13 is a plan view showing one pixel in the liquid crystal display device 1 in an enlarged manner. In the following embodiments, components already described with reference to FIGS. 1 through 7 are denoted by the same reference numerals, and thus detailed description thereof will be hereinafter omitted.

In the first embodiment, each pixel 3 is divided into two regions, i.e., the first region S1 and the second region S2. However, in this embodiment, each pixel is divided into, for example, six regions. In the liquid crystal display device 1 according to the present invention, each pixel 3 only needs to be divided into a plurality of regions. Therefore, the pixel 3 may be divided into any other number (at least two) of regions.

As shown in FIG. 13, three pixel electrodes 31 are provided in each pixel 3. The pixel electrodes 31 include: a first pixel electrode 31a connecting a drain electrode (not shown) of a TFT 20 and a capacitive electrode 34 to each other; and second and third pixel electrodes 31b and 31c provided at both sides of the first pixel electrode 31a with spacing. The pixel electrodes 31a, 31b and 31c extend in parallel with each other. One end of each of the second and third pixel electrodes 31b and 31c is connected to the capacitive electrode 34.

On the other hand, opposed electrodes 32 are provided at the sides of the pixel electrodes 31a, 31b and 31c. As shown in FIG. 13, the opposed electrodes 32 include: a first opposed electrode 32a; a second opposed electrode 32b; a third opposed electrode 32c; and a fourth opposed electrode 32d. The opposed electrodes 32a through 32d are parallel to the pixel electrodes 31.

The first opposed electrode 32a is provided at the left side of the second pixel electrode 31b. The second opposed electrode 32b is provided between the second pixel electrode 31b and the first pixel electrode 31a. The first opposed electrode 32a and the second opposed electrode 32b are connected to each other at their front ends and are connected to a common line 23 at their base ends.

In the same manner, the third opposed electrode 32c is provided between the first pixel electrode 31a and the third pixel electrode 31c. The fourth opposed electrode 32d is provided at the right side of the third pixel electrode 31c. The third opposed electrode 32c and the fourth opposed electrode 32d are connected to each other at their front ends and are connected to the common line 23 at their base ends.

In this manner, six regions are defined by the pixel electrodes 31a through 31c and the opposed electrodes 32a through 32d. To drive the liquid crystal display device 1 of this embodiment, electric fields in opposite directions are generated in adjacent regions, as in the first embodiment. Accordingly, the same effects as those in the first embodiment are obtained. In this case, if the distances between the pixel electrodes 31 and the opposed electrodes 32 are reduced, the intensity of a signal voltage necessary for generating a given electric field can be reduced.

EMBODIMENT 3

Figure 14:
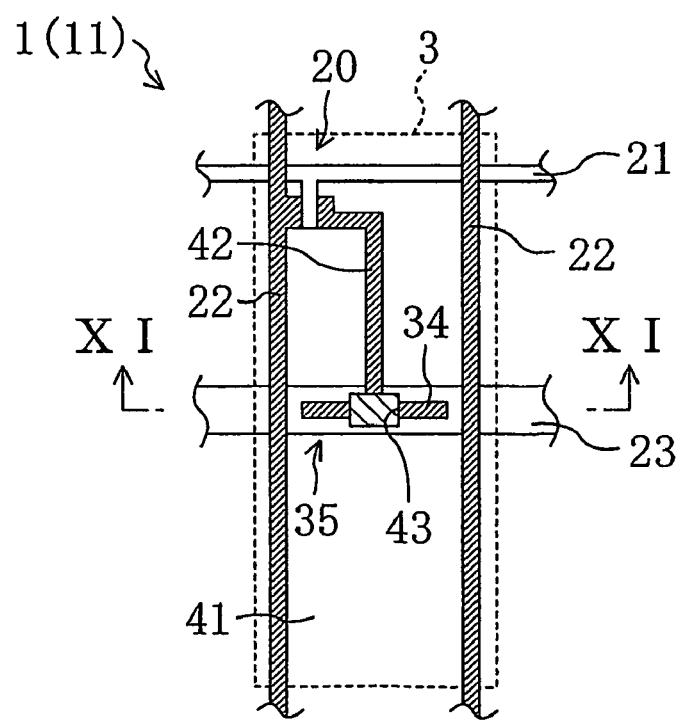
FIG. 14 is a plan view showing a lower layer in an array substrate of a liquid crystal device according to a third embodiment.
Figure 15:
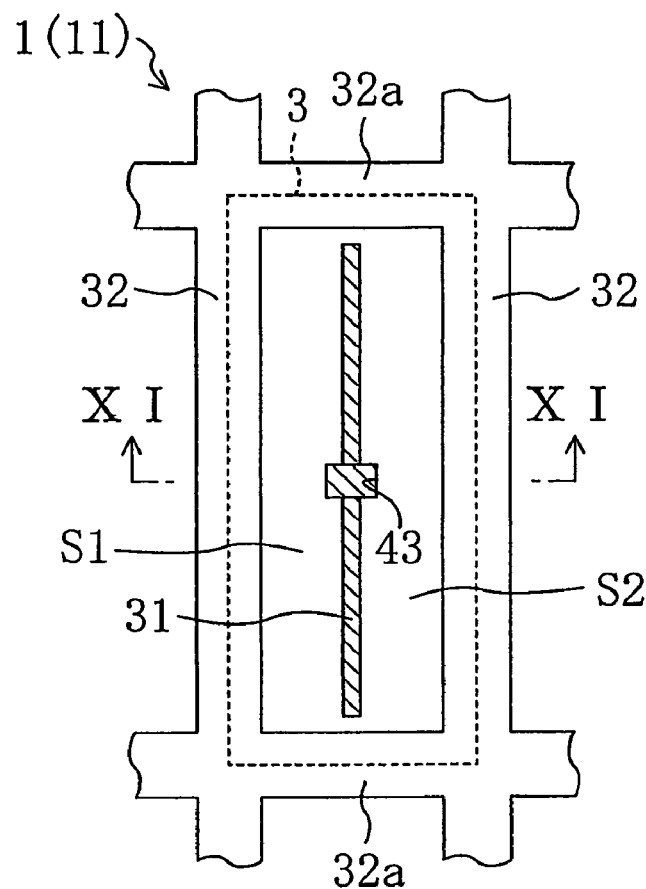
FIG. 15 is a plan view showing a upper layer in an array substrate of a liquid crystal device according to the third embodiment.
Figure 16:
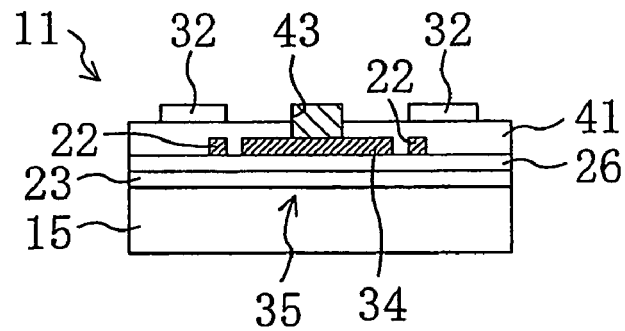
FIG. 16 is a cross-sectional view taken along the line XI-XI in FIGS. 14 and 15.

FIGS. 14 through 16 show a liquid crystal display device 1 according to a third embodiment of the present invention. FIG. 14 is a plan view showing a lower layer of an array substrate 11. FIG. 15 is a plan view showing an upper layer of the array substrate 11. FIG. 16 is a cross-sectional view taken along the line XI-XI in FIGS. 14 and 15. In FIGS. 14 and 15, the broken line shows one pixel 3.

In this embodiment, at least part of opposed electrodes 32 overlaps with signal lines 22 when viewed in the direction normal to the array substrate 11.

As shown in FIGS. 14 and 16, as in the first embodiment, scanning lines 21, the array substrate 11 includes a glass substrate 15 over which signal lines 22, TFTs 20, common lines 23, and auxiliary capacitors 35 are provided. Pixel electrodes 31 and the opposed electrodes 32 are further provided over the glass substrate 15 of the array substrate 11 with an interlayer insulating film 41 interposed therebetween.

As shown in FIG. 14, the common lines 23 are provided on the glass substrate 15 and are patterned to extend in parallel with the scanning lines 21 and pass through the centers of pixels 3. As shown in FIG. 16, an insulating film 26 is provided over the glass substrate 15 to cover the common lines 23.

In each pixel, a drain electrode (not shown) of each of the TFTs 20 is connected to the base end of a conductive extended portion 42. The front end of the extended portion 42 is connected to a capacitive electrode 34 extending along one of the common lines 23. As shown in FIG. 16, the extended portion 42, the capacitive electrode 34, the signal lines 22 and other components are formed on the insulating film 26 by patterning. That is, the capacitive electrode 34 and the common line 23 form an auxiliary capacitor 35 in each pixel.

An interlayer insulating film 41 is formed on the insulating film 26 to cover the extended portion 42, the capacitive electrode 34 and the signal lines 22. A contact hole 43 is vertically formed in the interlayer insulating film 41 to reach the capacitive electrode 34. The contact hole 43 is filled with a conductive material.

As shown in FIG. 15, the pixel electrode 31 and the opposed electrodes 32 are formed on the interlayer insulating film 41 by patterning. The pixel electrode 31 extends in parallel with the signal lines 22 from both sides of an upper portion of the contact hole 43. The pixel electrode 31 is connected to the capacitive electrode 34 via the conductive material in the contact hole 43.

The opposed electrodes 32 extend along the signal lines 22 above the signal lines 22. Adjacent ones of the opposed electrodes 32 are connected to each other via connecting portions 32a running along the scanning lines 21. In other words, the opposed electrodes 32 and the connecting portions 32a form a lattice pattern, which overlaps the lattice pattern formed by the scanning lines 21 and the signal lines 22 when viewed in the direction normal to the array substrate 11. In this way, the pixel electrodes 31 and the opposed electrodes 32 overlapping the signal lines 22 are disposed in parallel with each other. The liquid crystal display device 1 of this embodiment is driven in the same manner as in the first embodiment.

Accordingly, in the third embodiment, at least part of the opposed electrodes 32 overlaps with the signal lines 22, so that the aperture ratio of each pixel 3 is increased. As a result, luminance of light for display is enhanced, and display quality is improved.

OTHER EMBODIMENTS

In the foregoing embodiments, liquid crystal molecules 13a have pretilt angles with respect to the interfaces between the liquid crystal layer 13 and both the array substrate 11 and the counter substrate 12, and the liquid crystal layer 13 is in the state of a splay orientation. However, the present invention is not limited to this, and the liquid crystal molecules 13a may have a pretilt angle with respect to one of the interfaces.

Figure 17:
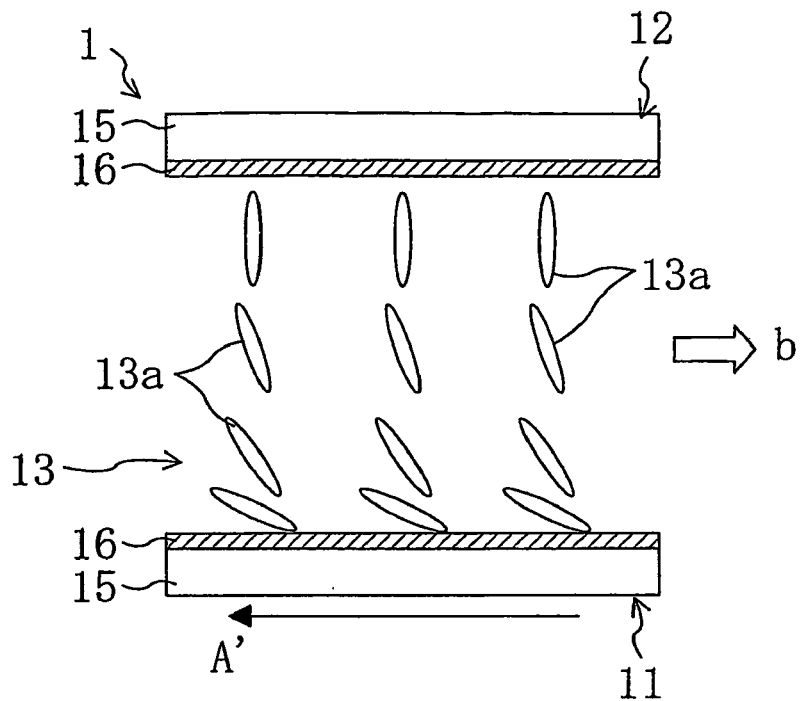
FIG. 17 is an illustration showing a liquid crystal layer showing a hybrid orientation according to another embodiment.

For example, as shown in FIG. 17, a rubbing process is performed on the alignment films 16 of the array substrate 11 in the direction A' that is opposite the rubbing direction in the first embodiment, thereby forming a pretilt angle with respect to the interface between the array substrate 11 and the liquid crystal layer 13. In addition, the liquid crystal molecules 13a may be vertically oriented (i.e., the length direction of each of the liquid crystal molecules 13a is vertical to the counter substrate 12) on the interface between the counter substrate 12 and the liquid crystal layer 13. That is, the liquid crystal layer 13 may be in the state of a hybrid orientation.

Figure 18:
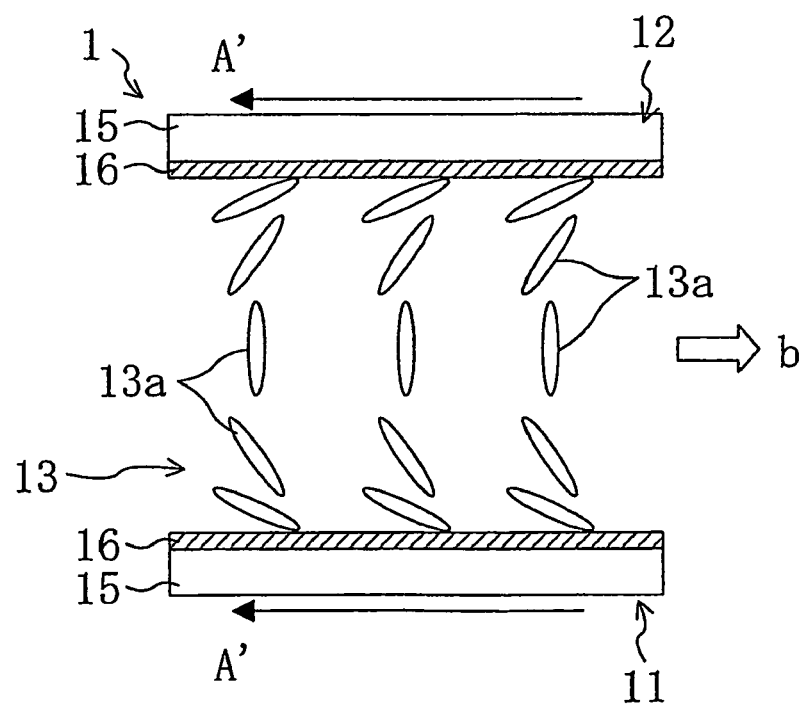
FIG. 18 is an illustration showing a liquid crystal layer showing a bend orientation according to another embodiment.

As shown in FIG. 18, a rubbing process is performed on the alignment films 16 included in both of the array substrate 11 and the counter substrate 12 in the direction A' opposite the rubbing direction in the first embodiment, thereby forming pretilt angles with respect to the interface between the array substrate 11 and the liquid crystal layer 13 and the interface between the counter substrate 12 and the liquid crystal layer 13. In this manner, the liquid crystal layer 13 may be in the state of a bend orientation. In both of the hybrid orientation and the bend orientation, polarization due to the flexoelectric effect is also achieved in the liquid crystal layer 13. The pretilt angle of the liquid crystal molecules 13a is determined by a rubbing process in the foregoing embodiments. Alternatively, the pretilt angle may be determined by a photo-alignment process.

Figure 19:
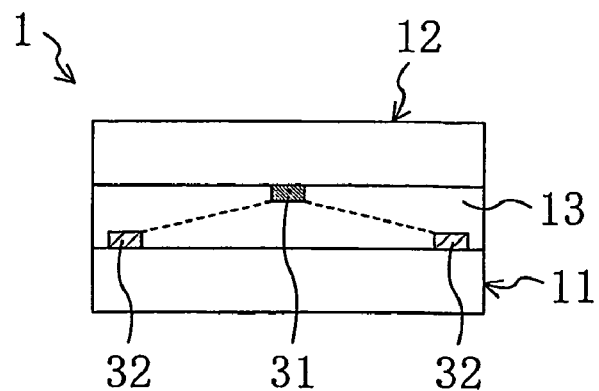
FIG. 19 is a cross-sectional view schematically showing an embodiment in which a pixel electrode is provided on an counter electrode.
Figure 20:
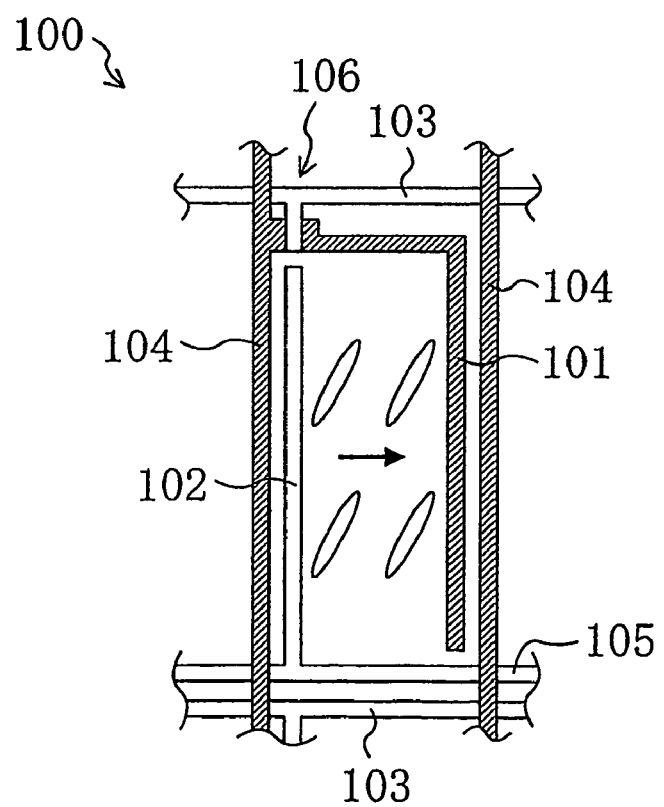
FIG. 20 is a plan view showing a conventional liquid crystal display device in an IPS mode in an enlarged manner.
Figure 21:
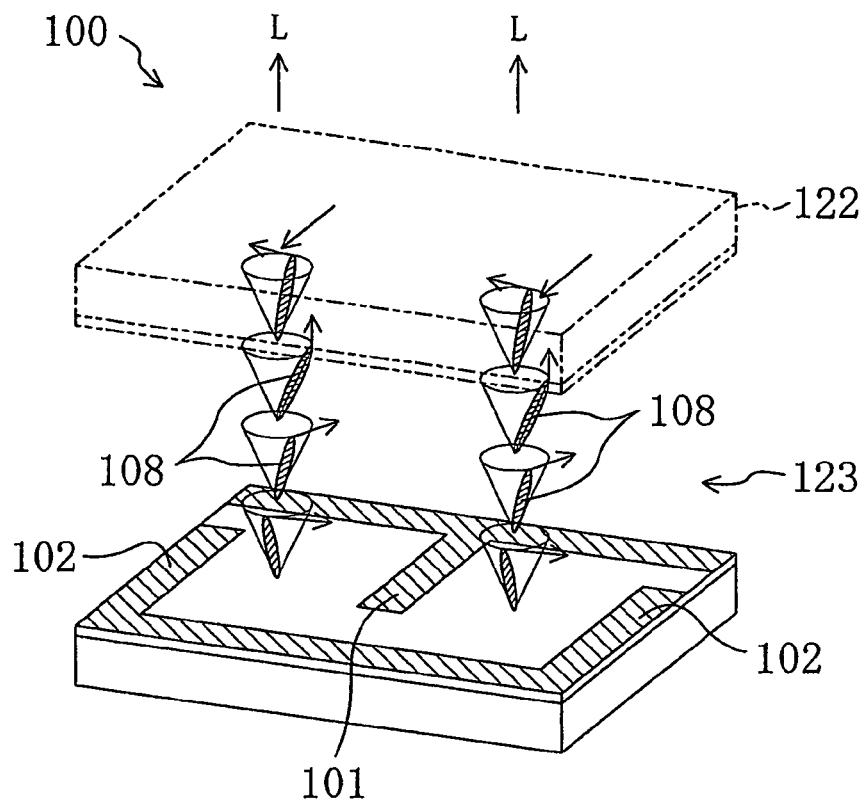
FIG. 21 is a perspective view showing a conventional liquid crystal display device under no application of a voltage.
Figure 22:
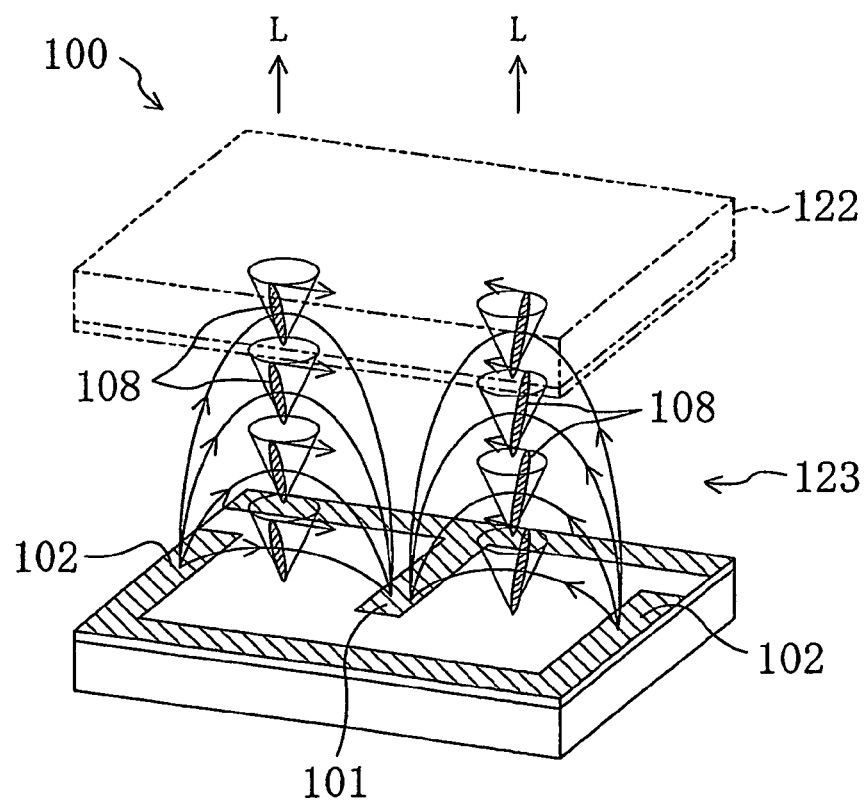
FIG. 22 is a perspective view showing the conventional liquid crystal display device under an application of a voltage.
Figure 23:
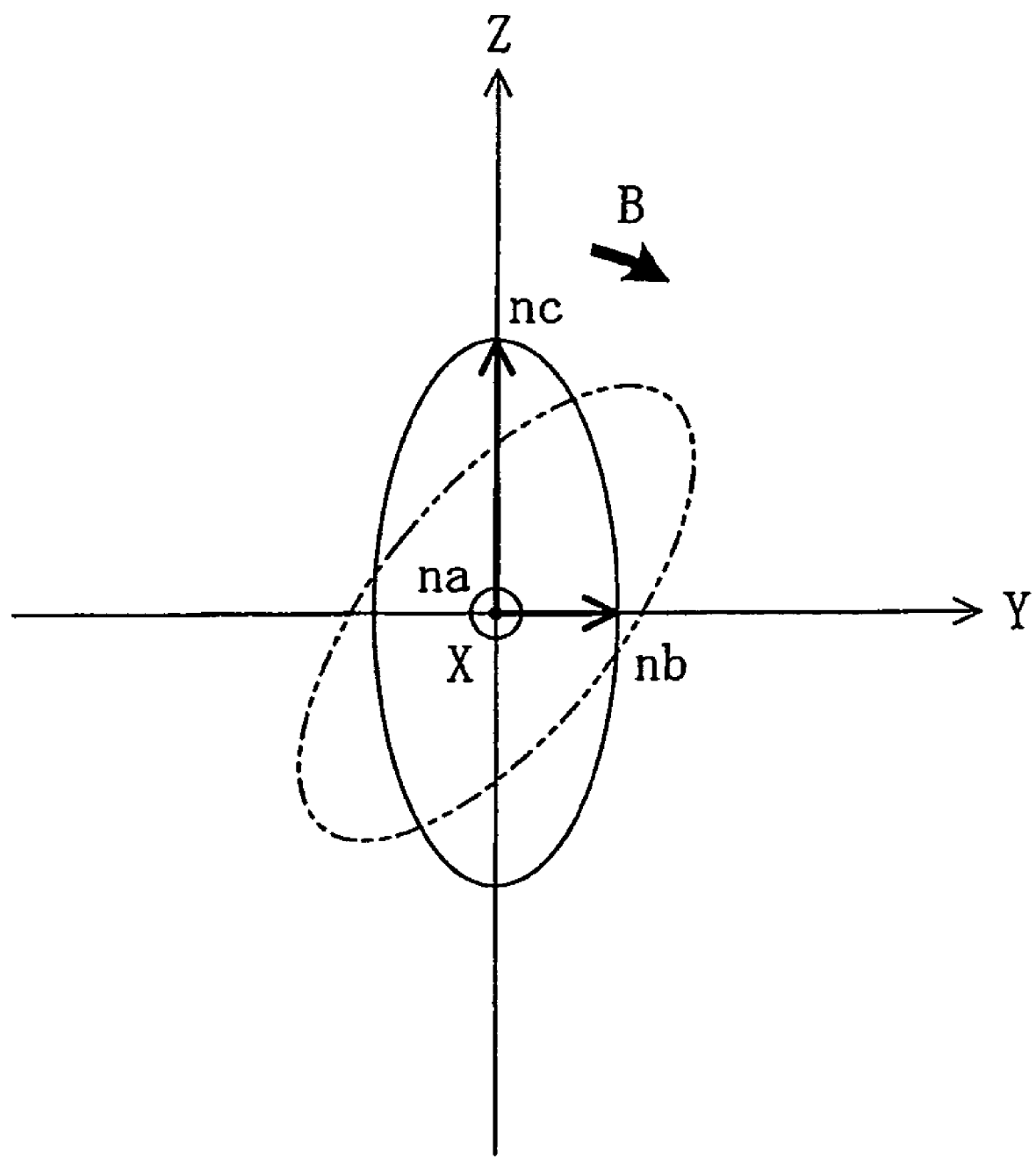
FIG. 23 is a graph for explaining an index ellipsoid.
Figure 24:
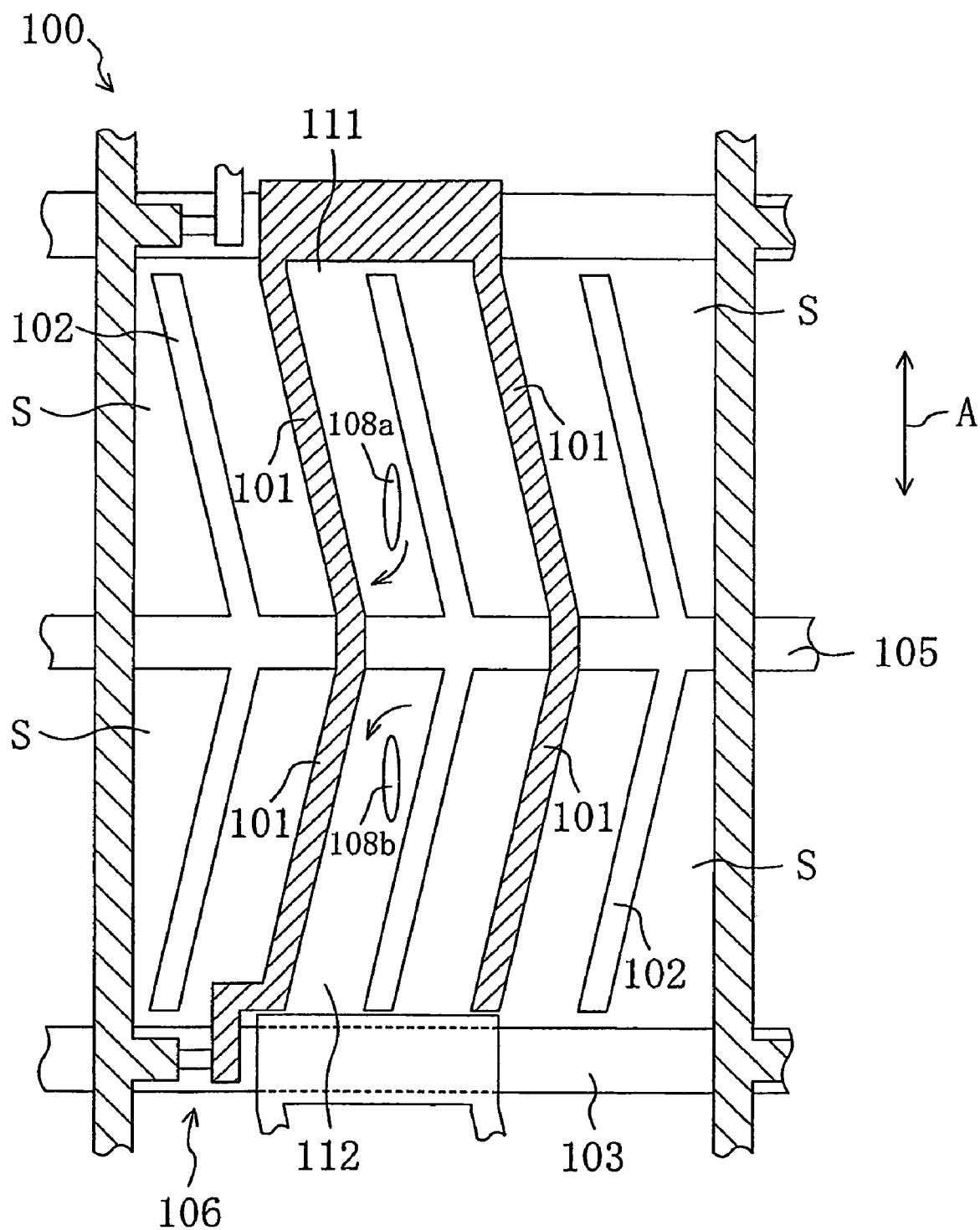
FIG. 24 is a plan view showing a conventional liquid crystal display device in an S-IPS mode.

In the foregoing embodiments, both the pixel electrodes 31 and the opposed electrodes 32 are provided on the array substrate 11. However, the present invention is not limited to this. Specifically, as shown in FIG. 19, two opposed electrodes 32, for example, may be provided on the array substrate 11 and one pixel electrode 31 may be provided on the counter substrate 12 such that the pixel electrode 31 is placed between the two opposed electrodes 32 when viewed in the direction normal to the substrates. Since the distance between the array substrate 11 and the counter substrate 12 is very small, it is possible to generate an electric field in a direction substantially parallel to the substrates 11 and 12 even in the above-described arrangement of the electrodes 31 and 32. As a result, the same effects as those obtained in the foregoing embodiments are obtained.

In the foregoing embodiments, the transmissive liquid crystal display devices in each of which both the substrates 11 and 12 serving as a pair are transparent. However, the present invention is not limited to this. Only one of the substrates 11 and 12 may be transparent. Then, the present invention is applicable to a reflective liquid crystal display device.

In the foregoing embodiments, when no electric field is generated, the slow axis of the liquid crystal layer 13 when viewed in the direction normal to the substrates 11 and 12 is vertical to the electric-field direction. However, the present invention is not limited to this. The slow axis may be parallel to the electric-field direction.

INDUSTRIAL APPLICABILITY

As described above, the present invention is useful for liquid crystal display devices and methods for driving the devices. In particular, the present invention is suitable for the purpose of preventing coloring resulting from increase of the viewing angle in display and depending on the direction of view, and for the purpose of increasing the display response speed and the aperture ratio.

The invention claimed is:

1. A liquid crystal display device comprising:
   a pair of substrates substantially parallel to each other, at least one of the substrates being transparent; and
   a liquid crystal layer sandwiched and held between the substrates,
   wherein a plurality of pixels each constituted by parts of the respective substrates and a part of the liquid crystal layer sandwiched between the parts of the substrates are arranged in a matrix pattern,
   each of the pixels includes first and second electrodes for generating, between the substrates, an electric field in a direction substantially parallel to the substrates and is divided into a plurality of regions,
   the regions of each of the pixels are defined by the first and second electrodes,
   the direction of an electric field generated in one of the regions is opposite to that of an electric field generated in an adjacent one of the regions,
   the liquid crystal layer has a structure in which when no electric field is generated, a slow axis indicating a refractive-index anisotropy as viewed in a direction normal to the substrates in each of the regions is vertical or parallel to the direction in which an electric field is to be generated whereas when an electric field is generated, the slow axis rotates about an axis normal to the substrates and slow axes in adjacent ones of the regions rotate in opposite directions,
   polarization is present in the liquid crystal layer when no electric field is generated between the first and second electrodes, and
   in the liquid crystal layer, a component of an average polarization direction in a direction parallel to the substrates is orthogonal to the direction in which an electric field is to be generated, when no electric field is generated between the first and second electrodes.

2. The device of claim 1, wherein the polarization in the liquid crystal layer is caused by a flexoelectric effect.

3. The device of claim 1, wherein the liquid crystal layer contains liquid crystal molecules having a pretilt angle with respect to at least the interface between the liquid crystal layer and one of the substrates.

4. The device of claim 3, wherein a direction obtained by projecting a pretilt direction of the liquid crystal molecules is orthogonal to the direction of an electric field generated between the first and second electrodes.

5. The device of claim 3, wherein the pretilt angle of the liquid crystal molecules is defined by one of a rubbing process and a photo-alignment process.

6. The device of claim 3, wherein the liquid crystal molecules have pretilt angles with respect to both of the interface between the liquid crystal layer and one of the substrates and the interface between the liquid crystal layer and the other substrate, and
   directions obtained by projecting pretilt directions of the liquid crystal molecules onto the respective substrates are identical.

7. The device of claim 1, wherein the first and second electrodes are driven such that potential levels of the respective first and second electrodes alternate with each other.

8. The device of claim 1, wherein each of the pixels includes a switching element for driving the liquid crystal layer, signal lines and scanning lines,
   the signal lines and the scanning lines are connected to the switching element and arranged in a lattice pattern, and
   the first and second electrodes extend in parallel with the signal lines or the scanning lines.

9. The device of claim 1, wherein the first and second electrodes are alternately arranged.

10. The device of claim 1, wherein at least part of the periphery of an electrode group composed of the first and second electrodes is constituted by opposed electrodes connected to a common line.

11. The device of claim 1, wherein the liquid crystal layer is driven at a frequency that is an even multiple of a frame frequency of a video signal, and
    a period in which the liquid crystal layer is driven by a positive electric field is equal to a period in which the liquid crystal layer is driven by a negative electric field.

12. The device of claim 1, wherein a pulse voltage applied to the liquid crystal layer is set at zero temporarily at every vertical synchronization period of a video signal.

13. The device of claim 1, wherein a pulse voltage applied to the liquid crystal layer in a vertical synchronization period of a video signal has a polarity opposite to that of a signal voltage applied to the liquid crystal layer in the same vertical synchronization period, at every vertical synchronization period.

14. The device of claim 1, wherein the liquid crystal layer is in the state of a splay orientation.

15. The device of claim 1, wherein the liquid crystal layer is in the state of a bend orientation.

16. The device of claim 1, wherein the liquid crystal layer is in the state of a hybrid orientation.

17. The device of claim 1, wherein a dielectric-constant anisotropy of the liquid crystal layer has an absolute value of three or less.

18. The device of claim 1, wherein a dielectric-constant anisotropy of the liquid crystal layer has an absolute value of one or less.

19. A method for driving the liquid crystal display device of claim 1, wherein the first and second electrodes are driven such that potential levels of the respective first and second electrodes alternate with each other.

20. A method for driving a liquid crystal display device comprising:
    a pair of substrates substantially parallel to each other, at least one of the substrates being transparent; and
    a liquid crystal layer sandwiched and held between the substrates,
    wherein a plurality of pixels each constituted by parts of the respective substrates and a part of the liquid crystal layer sandwiched between the parts of the substrates are arranged in a matrix pattern,
    each of the pixels includes first and second electrodes for generating, between the substrates, an electric field in a direction substantially parallel to the substrates and is divided into a plurality of regions,
    the regions of each of the pixels are defined by the first and second electrodes,
    the direction of an electric field generated in one of the regions is opposite to that of an electric field generated in an adjacent one of the regions,
    the liquid crystal layer has a structure in which when no electric field is generated, a slow axis indicating a refractive-index anisotropy as viewed in a direction normal to the substrates in each of the regions is vertical or parallel to the direction in which an electric field is to be generated whereas when an electric field is generated, the slow axis rotates about an axis normal to the substrates and slow axes in adjacent ones of the regions rotate in opposite directions, wherein
    the liquid crystal layer is driven at a frequency that is an even multiple of a frame frequency of a video signal, and
    a period in which the liquid crystal layer is driven by a positive electric field is equal to a period in which the liquid crystal layer is driven by a negative electric field.

21. A method for driving a liquid crystal display device comprising:
    a pair of substrates substantially parallel to each other, at least one of the substrates being transparent; and
    a liquid crystal layer sandwiched and held between the substrates,
    wherein a plurality of pixels each constituted by parts of the respective substrates and a part of the liquid crystal layer sandwiched between the parts of the substrates are arranged in a matrix pattern,
    each of the pixels includes first and second electrodes for generating, between the substrates, an electric field in a direction substantially parallel to the substrates and is divided into a plurality of regions,
    the regions of each of the pixels are defined by the first and second electrodes,
    the direction of an electric field generated in one of the regions is opposite to that of an electric field generated in an adjacent one of the regions,
    the liquid crystal layer has a structure in which when no electric field is generated, a slow axis indicating a refractive-index anisotropy as viewed in a direction normal to the substrates in each of the regions is vertical or parallel to the direction in which an electric field is to be generated whereas when an electric field is generated, the slow axis rotates about an axis normal to the substrates and slow axes in adjacent ones of the regions rotate in opposite directions, wherein
    a pulse voltage applied to the liquid crystal layer is set at zero temporarily at every vertical synchronization period of a video signal.

22. A method for driving a liquid crystal display device comprising:
    a pair of substrates substantially parallel to each other, at least one of the substrates being transparent; and
    a liquid crystal layer sandwiched and held between the substrates,
    wherein a plurality of pixels each constituted by parts of the respective substrates and a part of the liquid crystal layer sandwiched between the parts of the substrates are arranged in a matrix pattern, each of the pixels includes first and second electrodes for generating, between the substrates, an electric field in a direction substantially parallel to the substrates and is divided into a plurality of regions, the regions of each of the pixels are defined by the first and second electrodes, the direction of an electric field generated in one of the regions is opposite to that of an electric field generated in an adjacent one of the regions, the liquid crystal layer has a structure in which when no electric field is generated, a slow axis indicating a refractive-index anisotropy as viewed in a direction normal to the substrates in each of the regions is vertical or parallel to the direction in which an electric field is to be generated whereas when an electric field is generated, the slow axis rotates about an axis normal to the substrates and slow axes in adjacent ones of the regions rotate in opposite directions, wherein a pulse voltage applied to the liquid crystal layer in a vertical synchronization period of a video signal has a polarity opposite to that of a signal voltage applied to the liquid crystal layer in the same vertical synchronization period, at every vertical synchronization period.

23. A liquid crystal display device comprising:

a pair of substrates substantially parallel to each other, at least one of the substrates being transparent; and a liquid crystal layer sandwiched and held between the substrates, wherein a plurality of pixels each constituted by parts of the respective substrates and a part of the liquid crystal layer sandwiched between the parts of the substrates are arranged in a matrix pattern, a plurality of scanning lines and a plurality of signal lines are formed in one of the pair of the substrates, each of the pixels includes first and second electrodes for generating, between the substrates, an electric field in a direction substantially parallel to the substrates and is divided into a plurality of regions, the regions of each of the pixels are defined by the first and second electrodes, the direction of an electric field generated in one of the regions is opposite to that of an electric field generated in an adjacent one of the regions, the liquid crystal layer has a structure in which when no electric field is generated, a slow axis indicating a refractive-index anisotropy as viewed in a direction normal to the substrates in each of the regions is vertical or parallel to the direction in which an electric field is to be generated whereas when an electric field is generated, the slow axis rotates about an axis normal to the substrates and slow axes in adjacent ones of the regions rotate in opposite directions, and at least part of the second electrodes overlaps with the signal lines when viewed in the direction normal to surfaces of the substrates.

* * * * *

UNITED STATES PATENT AND TRADEMARK OFFICE
CERTIFICATE OF CORRECTION

| | |
|---|---|
| PATENT NO. | : 7,564,510 B2 |
| APPLICATION NO. | : 10/585855 |
| DATED | : July 21, 2009 |
| INVENTOR(S) | : Miyachi et al. |

It is certified that error appears in the above-identified patent and that said Letters Patent is hereby corrected as shown below:

Title Page insert

--(30) Foreign Application Priority Data

Jan. 26, 2004   (JP)   Japan ..................... 2004-017667--

Signed and Sealed this

Twenty-first Day of September, 2010

David J. Kappos
*Director of the United States Patent and Trademark Office*